(12) United States Patent  (10) Patent No.: US 8,284,715 B2
Jalil et al.  (45) Date of Patent: Oct. 9, 2012

(54) METHOD AND APPARATUS FOR NETWORK WIDE ADAPTIVE RESOURCE ALLOCATION FOR OFDMA/TDMA NETWORKS

(75) Inventors: Rehan Jalil, San Jose, CA (US);
Mustafa Ergen, Oakland, CA (US);
Tony Mak, San Francisco, CA (US)

(73) Assignee: WiChorus, Inc., San Jose, CA (US)

( * ) Notice: Subject to any disclaimer, the term of this patent is extended or adjusted under 35 U.S.C. 154(b) by 1097 days.

(21) Appl. No.: 11/644,706

(22) Filed: Dec. 22, 2006

(65) Prior Publication Data

US 2009/0080375 A1  Mar. 26, 2009

Related U.S. Application Data

(60) Provisional application No. 60/753,709, filed on Dec. 22, 2005.

(51) Int. Cl.
*H04W 4/00*  (2009.01)
(52) U.S. Cl. .......................... 370/328; 370/329; 370/330
(58) Field of Classification Search ........... 370/328–330
See application file for complete search history.

(56) References Cited

U.S. PATENT DOCUMENTS

| | | | |
|---|---|---|---|
| 5,666,649 A | 9/1997 | Dent | |
| 6,493,331 B1 | 12/2002 | Walton et al. | |
| 6,496,700 B1 | 12/2002 | Chawla et al. | |
| 6,993,333 B2 | 1/2006 | Laroia et al. | |
| 7,636,334 B2 | 12/2009 | Gerlach | |
| 7,664,193 B2 | 2/2010 | Jalali et al. | |
| 2005/0141450 A1* | 6/2005 | Carlton et al. | 370/329 |
| 2005/0169229 A1* | 8/2005 | Cho et al. | 370/344 |
| 2006/0003767 A1 | 1/2006 | Kim et al. | |
| 2006/0018347 A1 | 1/2006 | Agrawal | |
| 2006/0072501 A1* | 4/2006 | Toshimitsu et al. | 370/328 |
| 2006/0239264 A1 | 10/2006 | Kang et al. | |
| 2007/0253367 A1 | 11/2007 | Dang et al. | |
| 2007/0297363 A1 | 12/2007 | Jalil et al. | |
| 2010/0220696 A1 | 9/2010 | Jalil et al. | |

* cited by examiner

*Primary Examiner* — Dwayne Bost
*Assistant Examiner* — Yungsang Lau
(74) *Attorney, Agent, or Firm* — Hamilton, Brook, Smith & Reynolds, P.C.

(57) ABSTRACT

The disclosure proposes an adaptive resource allocation in a network. A resource is divided into Blocks and each base station is assigned a Block for its subscribers that are in the interference region, and another Block for its subscribers that are not in the interference region. Blocks other than these two are not used by the base station. Bordering base stations does not use the same Block if they have any subscribers in the shared interference region. The disclosure proposes a resource sizing along with load balancing scheme. The resource sizing is adaptable and may change over time according to topology.

20 Claims, 12 Drawing Sheets

METHOD AND APPARATUS FOR NETWORK WIDE ADAPTIVE RESOURCE ALLOCATION FOR OFDMA/TDMA NETWORKS

RELATED APPLICATION AND PRIORITY

This non-provisional application is claiming the priority date of an earlier-filed U.S. provisional application Ser. No. 60/753,709 filed on Dec. 22, 2005 under 35 U.S.C. §119(e)

SUMMARY OF THE INVENTION

In a typical cell deployment, interference regions can be mitigated in space, time and frequency. Overlaid but not co-located base stations can interfere with each others thereby create regions, called interference region (IR), in which a terminal, which could be fixed or mobile, receives signals from more than one base station. If a single channel is used across the network where there are plurality of base stations, communication in interference regions can be disruptive if there is no resource management. For a channel with a given bandwidth, we define the total resource available as RES. The basic unit in RES is called slot, and each slot occupies a frequency bin and a symbol time. Multiple slots can be combined into a unit called Block. We partition RES into Blocks where each Block contains different slots, and size of each Block is not necessary the same.

Typically, a base station can use some of these Blocks, and up to RES. Let $B_i$ to be the ith Block in RES. If IR doesn't exist in the network or there is no active terminal in the IR(s), each base station can use the entire RES for its terminals. Otherwise, the same $B_i$ used by a base station for terminals in its IR can not be used by any base stations in which it shares the IR with. Define BC(j) to be the Block allocated to station j for its associated mobiles in its IR.

Intuitively, if the resource in the network is not managed properly, the resource available to a base station i would only be $$RES(i) = RES - \sum_{\forall j \in \{interferer(i)\}} BC(j),$$

where {interferer(i)} is the set of base stations that base station i interferes with. As {interferer(i)} or each BC(j) grows, the RES(i) diminishes. Since BC(i) is the resource for terminals in the IR of station i, the terminals attached to station i who are not in its IR can only have the remaining RES(i)−BC(i).

The resource management method proposed here tries to maximize the overall network throughput $$\left(\text{i.e. } \sum_{\forall i} RES(i)\right),$$

we want the throughput to approach M*RES, where M is total number of stations. The underlying mechanism is that we want to increase the resource reuse in IR(s) (i.e. for any j, k∈{int erferer(i)}, we want BC(j)⊆BC(k)) such that $$\sum_{\forall j \in \{interferer(i)\}} BC(j)$$

is minimized for all station i).

DETAILED DESCRIPTION OF THE INVENTION WITH CERTAIN EMBODIMENTS

Figure 1:
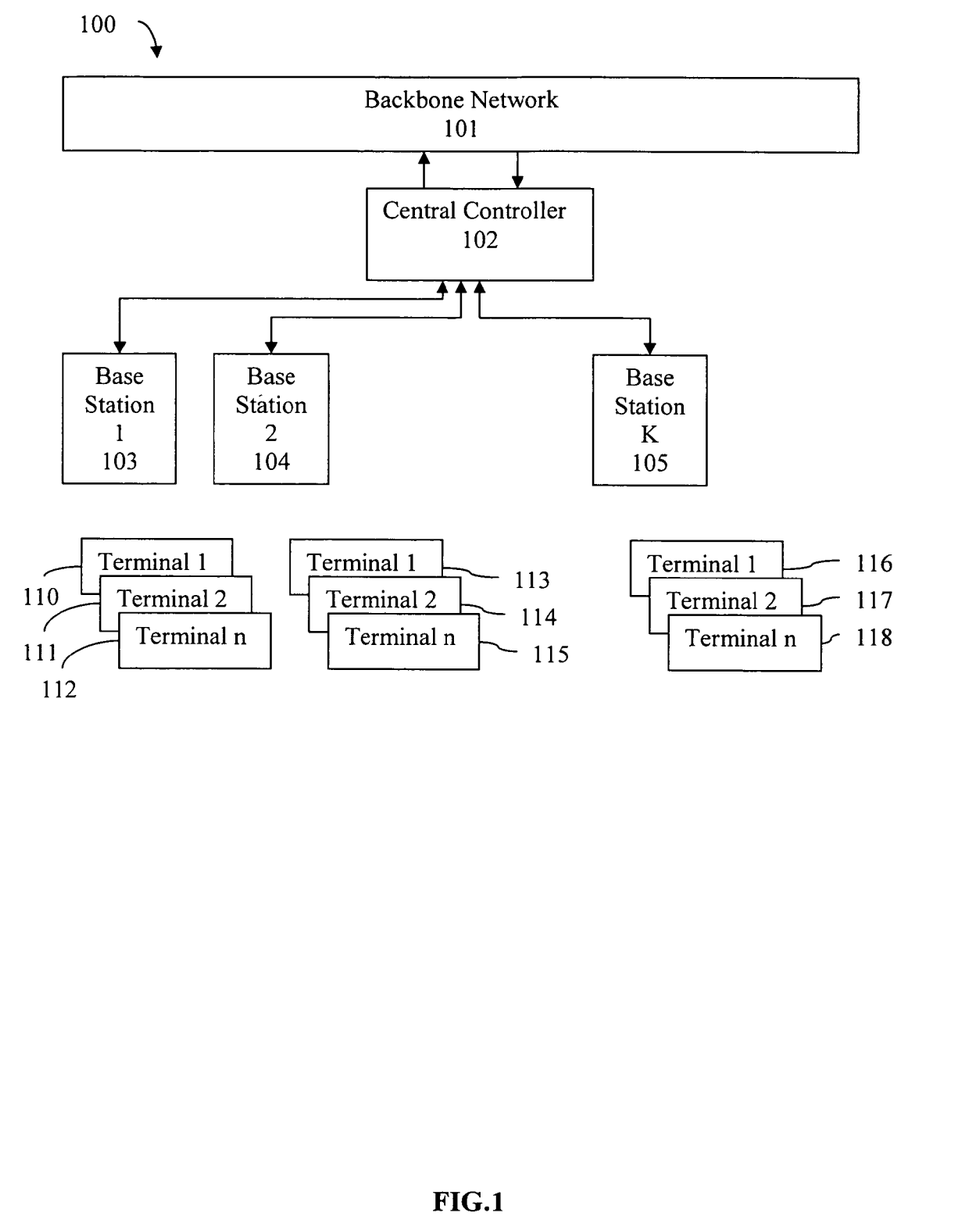
FIG. 1 illustrates a network architecture, in the context of the present disclosure.

Proposed system 100 has a Central Controller 102, plurality of Base Stations 103-105, and plurality of Terminals 110-118 as entities. Central Controller is attached to the Backbone Network 101, and it captures the incoming traffic and routes to the base stations. Besides having the routing functionality, Central Controller does high-level resource management across the network for the base stations. Base stations are entities that has wired and wireless interface. They talk to terminals through their wireless interfaces. Each base station has a fixed amount of resource per frame and is required to distribute this resource to its terminals.

System and Method

Figure 2:
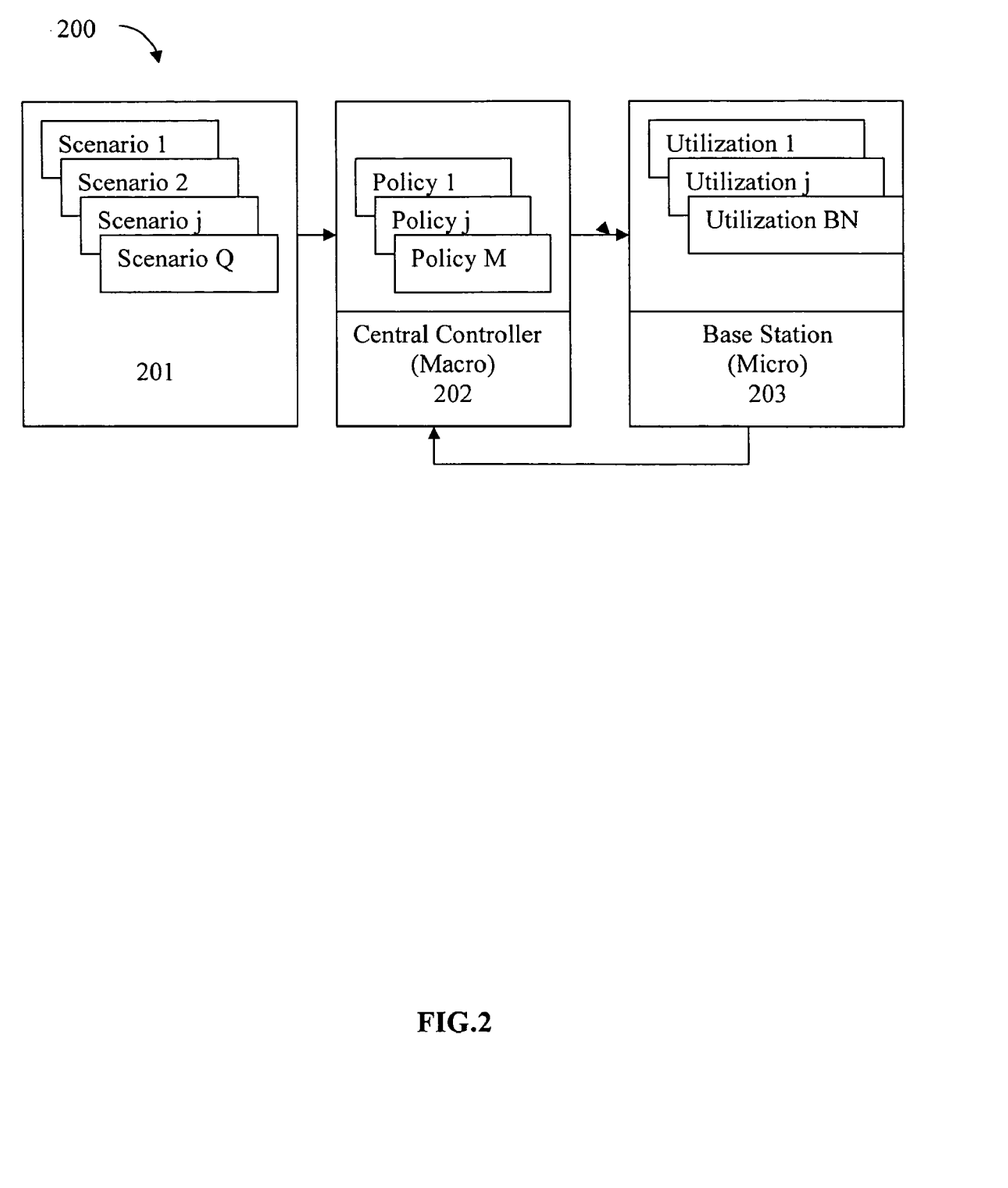
FIG. 2 illustrates a policy based macro and micro scheduling, according to an embodiment.
Figure 4:
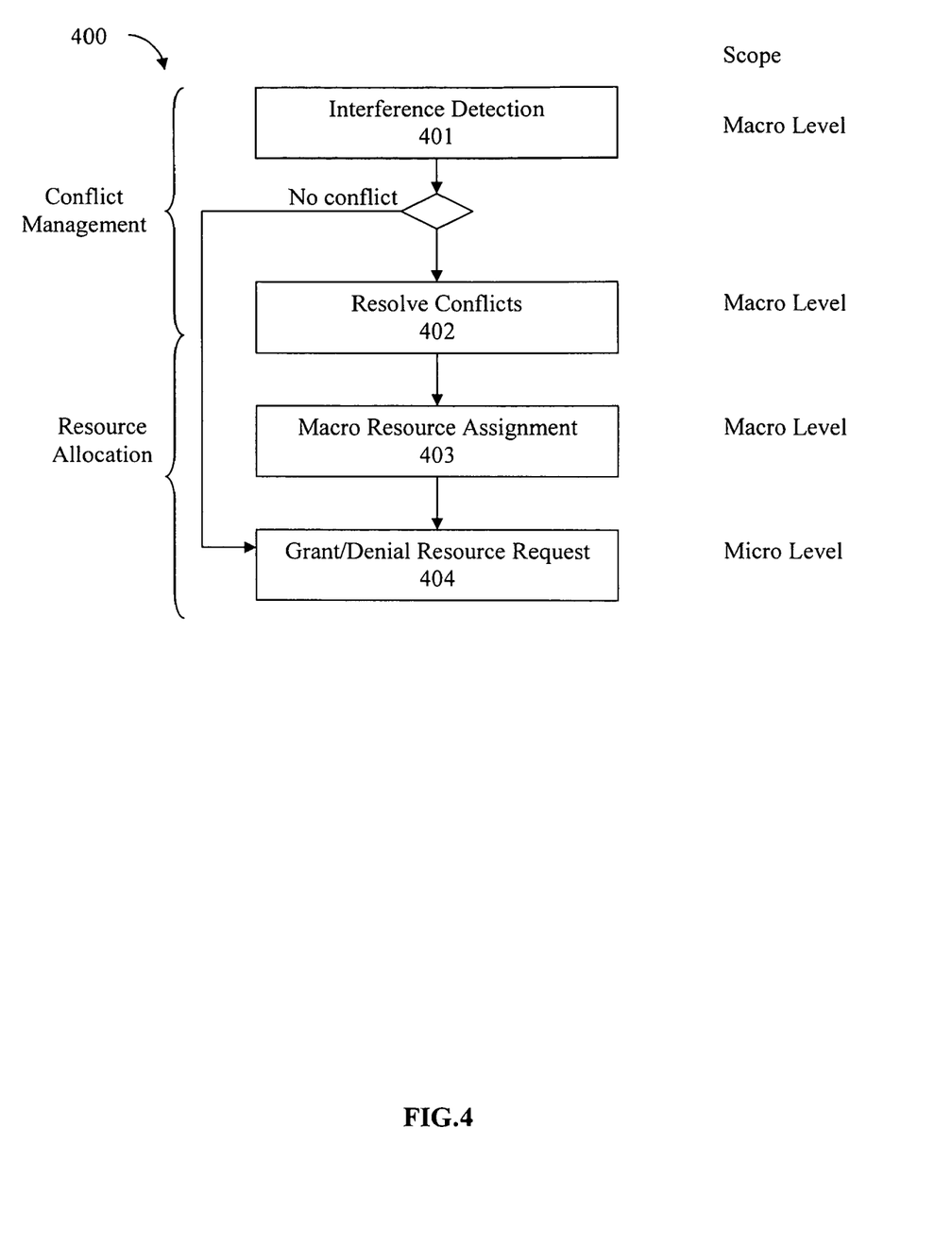
FIG. 4 shows a flow diagram for macro resource assignment, according to an embodiment.

In order to satisfy every traffic demand and network topology, a feed back control method 200 is proposed. The system diagram shown in FIG. 4 depicts that depending on the scenario 201 a particular policy 202 is selected by the central controller and that policy is updated with respect to the change in the scenario or output utilization 203 of each base station.

Network Entry/Exit

1. Life Cycle of a Communication Request

Figure 3:
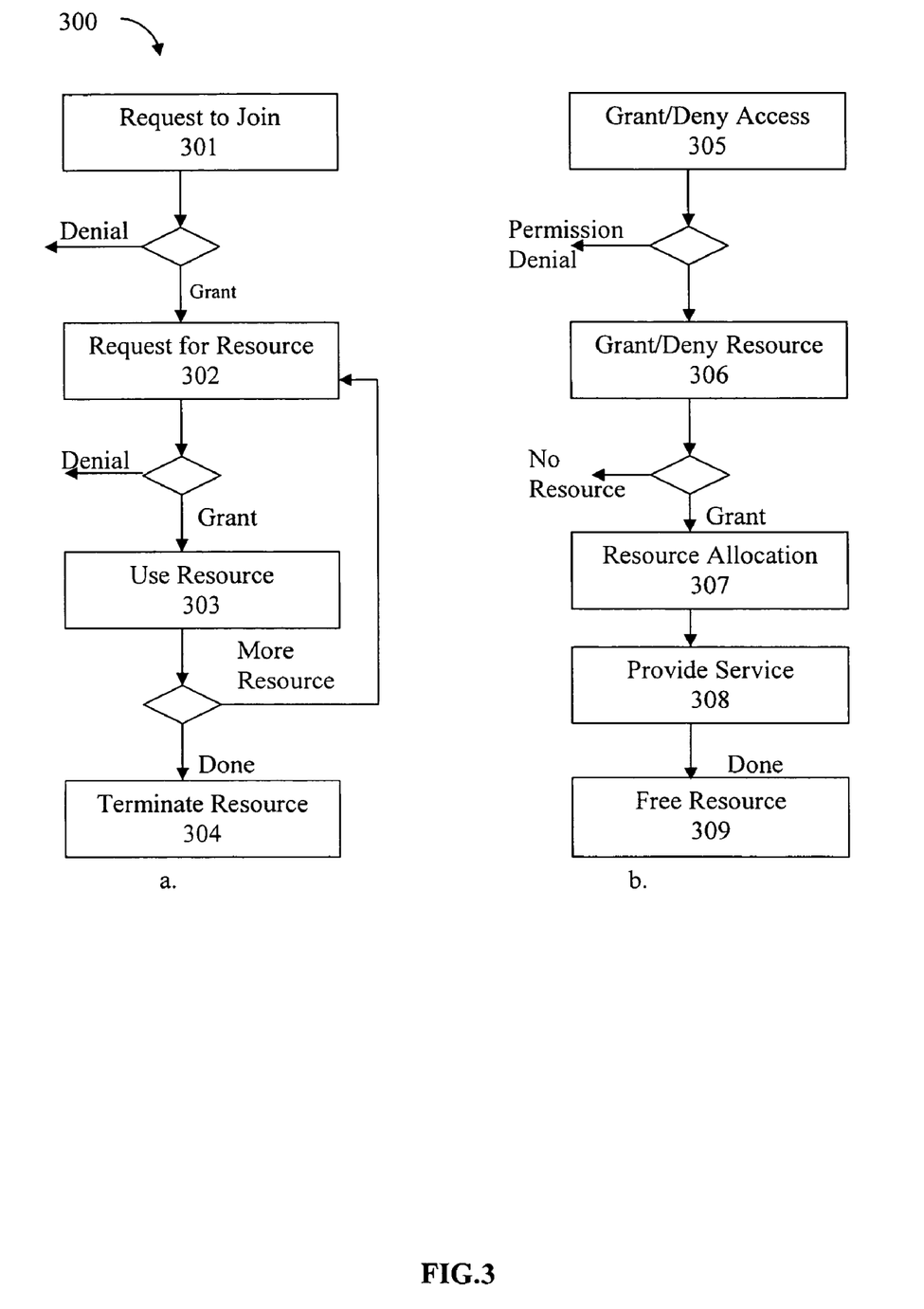
FIG. 3 depicts a resource grant/deny flow chart, according to an embodiment.

FIG. 3a contains the process of a terminal requesting access to the network. FIG. 3b contains the process of servicing a terminal request.

2. Resource Management Overview

FIG. 4 contains the overall process of the Resource Management 400 handled by the resource manager. The resource management can be divided into two parts. The first part is the conflict management 401-402, where the resource manager identifies all conflicts (i.e. the terminals in the IR(s) between two or more base stations). If there is no terminal or terminals are inactive in IR(s), each base station i can use full resources (i.e. RES(i)=RES); else resource manager has to resolve the conflicts between base stations (i.e. associate each terminal in IR(s) to only one base station). The second part is the resource allocation 403-404, where the resource manager first allocates BC(i) to each station i, and given the current allocation, station i assigns the slots in RES(i) to each associated terminal based on its demand.

3. Approaches to Resource Management

There are three approaches to resource management.

The first is the centralized approach called centralized micro-resource management, where the central controller handles the entire resource management across the entire network. The second approach is called the split-resource management, where the central controller performs macro-level resource assignments and Base Station performs micro-level resource assignments.

The third is the distributed approach called distributed micro-resource management, where each Base Station coordinates with its neighbors to perform resource management locally. The last approach is not considered here since typically frequent communication between base stations is not feasible if performance is considered. The methods for first and second approach are discussed below.

3.1 Centralized Micro-Resource Management

Figure 5:
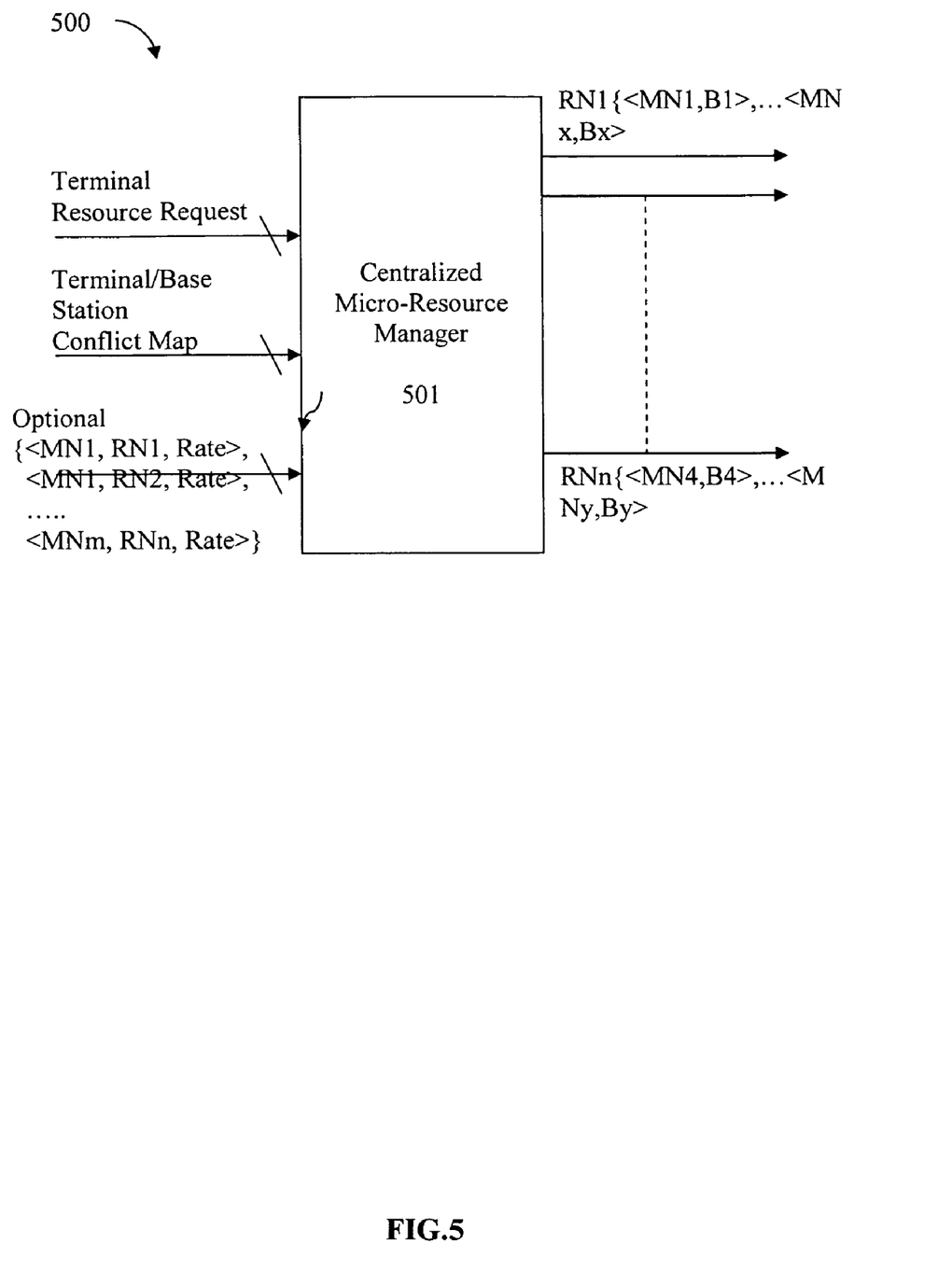
FIG. 5 shows a flow diagram for centralized resource manager, in the context of the present disclosure.

The centralized micro-resource manager 501 performs resource management in the centralized controller. Consider the inputs and outputs of this component in FIG. 5, the resource manager takes a list of terminals with its location and resource request, a list of base station locations, and associates each terminal with its allocated resource to a base station. Here, the following challenges arise:

Frequency of the redistribution of resources

Handling of new request or entry of new terminal

If the resource manager is executed very infrequently, any new requests will incur large delay. However, if it is run very frequently, there will be a lot of traffic between the centralized controller and base stations. One advantage of this scheme is that it maximizes the overall throughput of the network due to its global view.

3.2 Split-Resource Management

Figure 6:
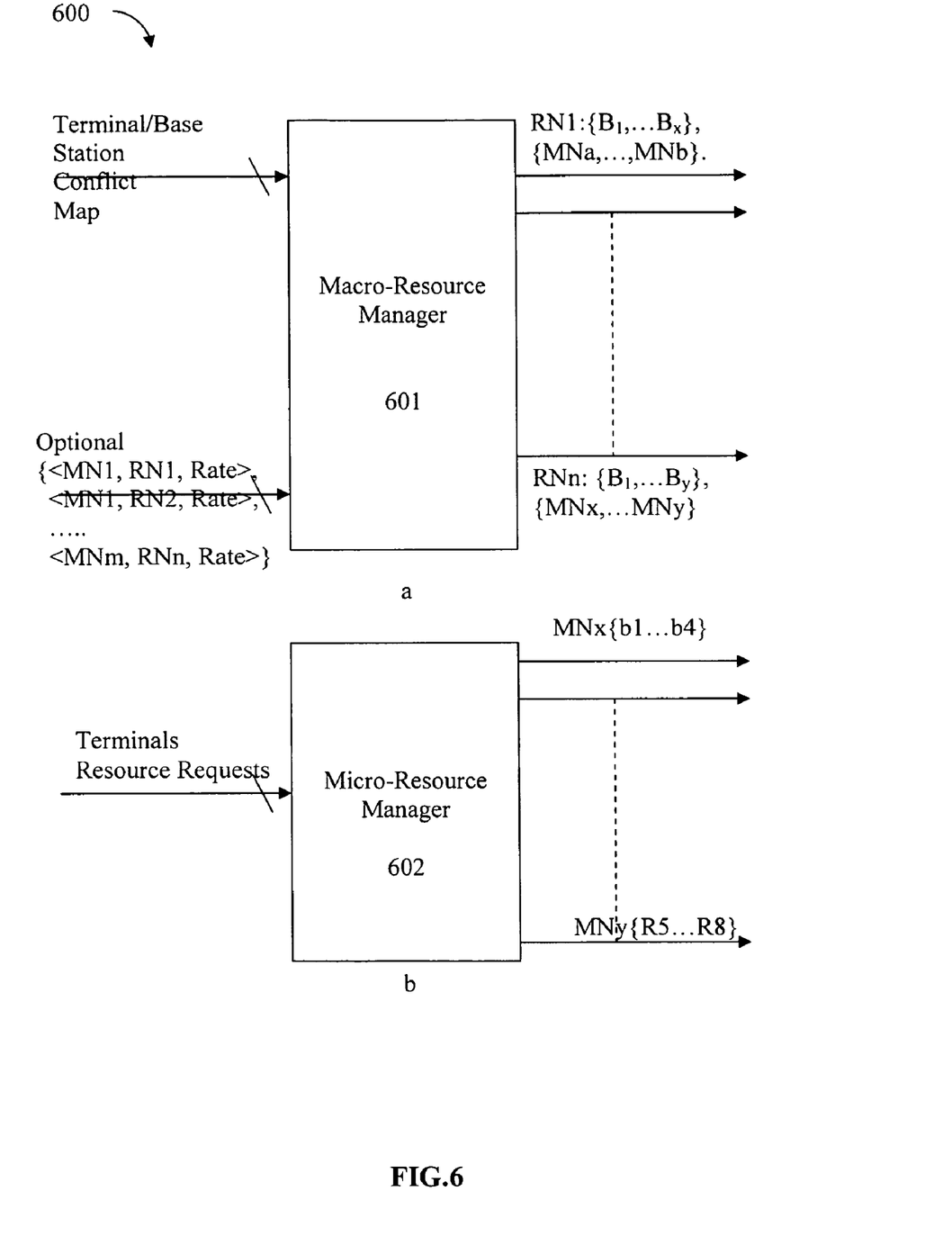
FIG. 6 shows inputs and outputs of macro and micro resource manager for split-resource manager, according to an embodiment.

In the split-resource management 600, we divide the whole resource management responsibilities into two parts. The Macro-Level Managements defined in FIG. 4 is handled by the Macro-Resource Manager 601 running on the centralized controller, and the Micro-Level Managements is handled by Micro-Resource Manager 602 running on individual base stations. The input and output relation (See FIG. 6) of the Macro-Level Manager is described as follows: the Macro-Resource Manager takes a list of terminal locations and a list of base station locations or the connectivity table between terminals nodes and base stations as inputs, and produces a list of Blocks to each base station. Connectivity is defined as the ability for a terminal and a station to communicate bidirectionally. The allocation scheme is discussed in the later section. Each output is then addressed to each Micro-Resource Manager. Given the allocated resources and terminals requests, Micro-Resource Manager assigns the resources to the terminals accordingly.

3.2.1 Macro-Resource Manager

The tasks of Macro-Resource Manager are: 1) Minimize interference in the IR(s). 2) Optimize entire network performance according but not limit to throughput and fairness. 3) Allocate Blocks to base station. The flow diagram of Macro-Resource Manager is described in FIG. 7. The details of each block are discussed in the following sections.

3.2.1.1 Interference Detection 701

Figure 7:
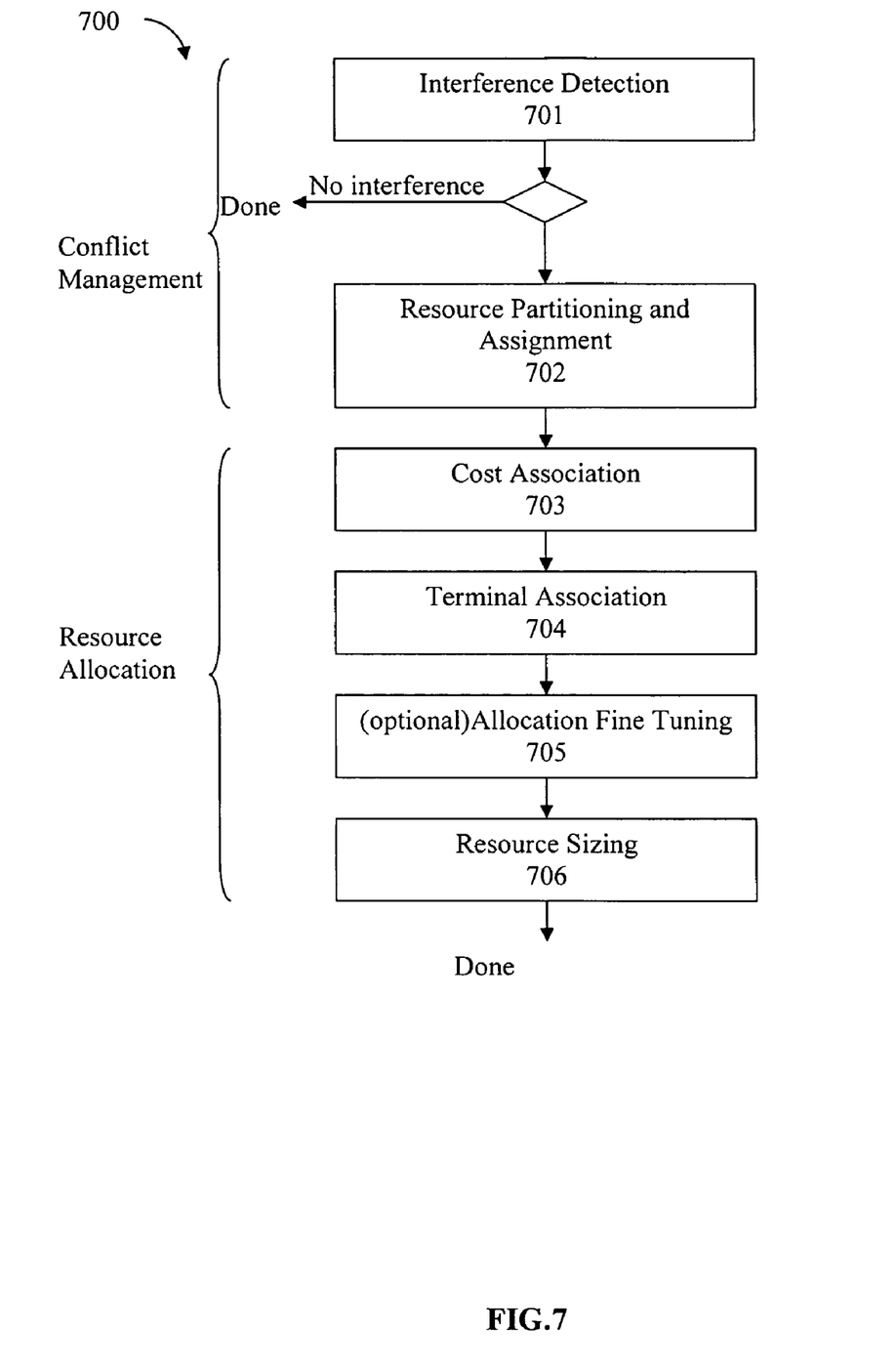
FIG. 7 shows a conflict management and resource allocation flow chart according to an embodiment.

The resource manager first identifies the IR(s). A terminal is considered to be in the IR(s) if a terminal is within the communication range of two or more base stations or it is able to communicate more than two base stations. This can be done based on terminal and base stations locations or the connectivity table of terminal and base stations. If no conflict is detected, then there is no IR.

3.2.1.2 Resource Partitioning and Assignment 702

Figure 11:
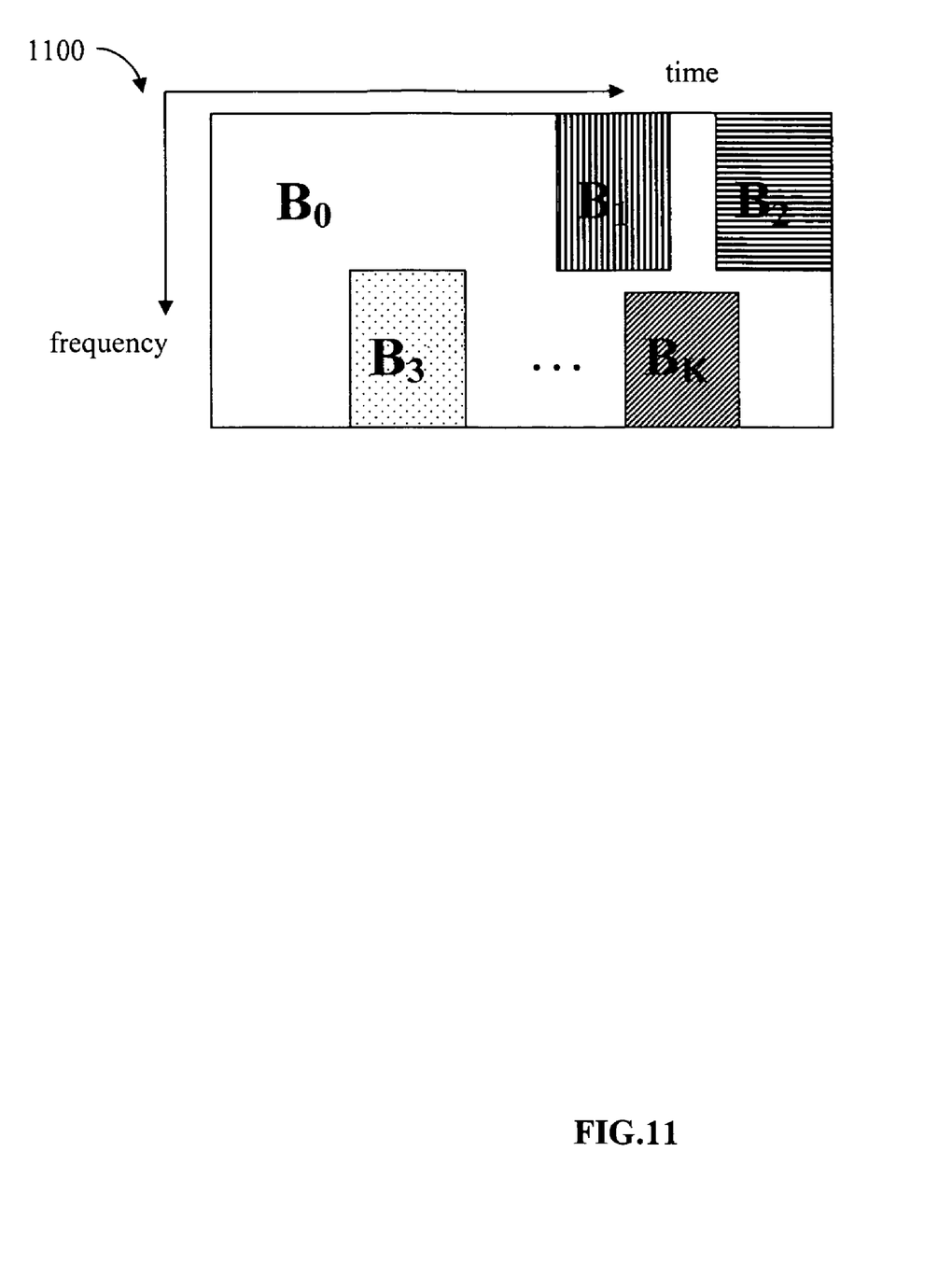
FIG. 11 shows a possible allocation in an OFDMA frame, according to an embodiment.
Figure 12:
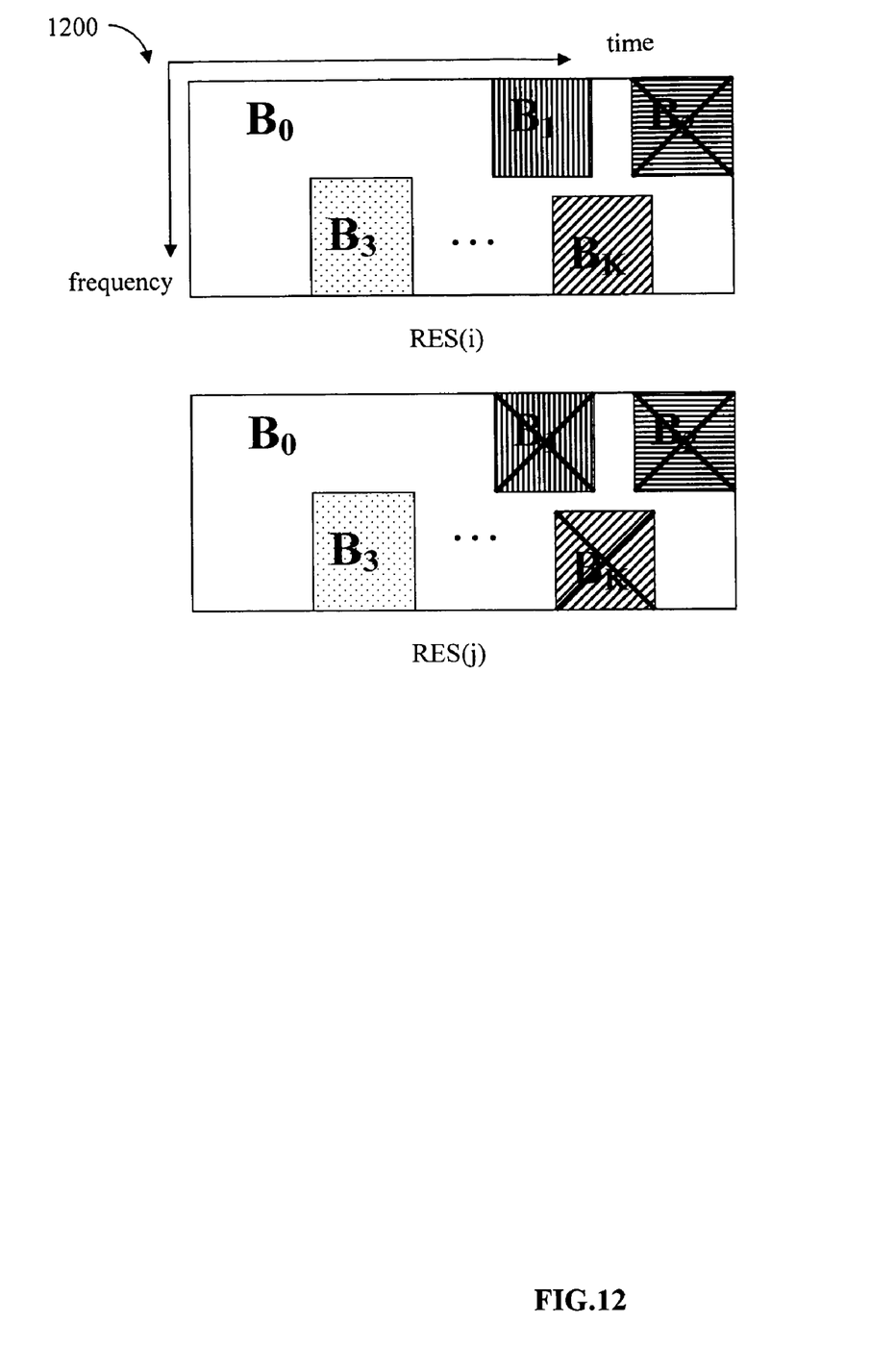
FIG. 12 shows a possible allocation of two base stations with coordination, according to an embodiment.

The RES 1100 is partitioned into Blocks, and each base station inherits the same partition (see FIG. 11). For a given base station, we would like its interferers to re-use the same blocks (i.e. minimize number of partitions). Thus, its available resource is maximized. The actual size of each Block is determined in the later step. If maximum number of interferers a base station can have is C, it can easily be shown that maximum number of partitions in RES is C+1 (i.e. one Block allocated to each of its interferer, one Block for terminals in its IR and one Block for terminals not in its IR). Each Block is defined as $B_i$, where i is the index of the Block, and $B_0$ is reserved for terminals who are not in the IR. Consider all base stations that base station i interferes, by constructing a conflict graph, then this problem can be formulated as a graph coloring problem in which we can determine the minimum number of partitions as well as the corresponding assignments. If the minimum number of partitions is K, then the set of partition will be $\{B_0, B_1, \ldots, B_K\}$. Each base station is assigned to one of the element in the set $\{1, 2 \ldots K\}$, and the element is used to identify the Block reserved for the terminals in its IR which are attached to it. The block $B_0$, and any $B_i$ that is not being used by its interferers can be used by mobiles attached to it who are not in its IR. For example, consider FIG. 12, $B_1$ is allocated to base station i for terminals attached to it in its IR, and $B_2$ is allocated to the interferer of base station i in which it can not use. Since interferers of base station i do not use any other Blocks, other than $B_1$ and $B_2$, it can use the remaining Blocks for terminals attached to it who are not in its IR. The subsequent methods proposed next determine the actual sizing of each $B_i$.

3.2.1.3 Cost Association 703

Each terminal is assigned to a cost weight or a series of cost weights such as one per station it can communicate. The weight can be a function of a terminal's receive/transmit signal strength, traffic demand and etc. For example, suppose only one cost weight is assigned to each terminal. If the objective is to achieve fairness (i.e. assign each terminal same number of slots), each terminal will be assigned an equal weight. On the other hand, if the objective is to maximize network utilization, each terminal will be assigned according to its demand for resource (i.e. average traffic demand for each terminal divided by its current highest available rate). No resource is assigned to inactive terminals. This cost weight is used in the next step.

3.2.1.4 Terminal Association 704

Here, we associate terminals to base stations. The terminals who are not in the IR(s) are immediately assigned to the base station in which they can communicate with. For the terminals who are in the IR(s), we associate them with a base station in a way that maximizes the overall network utilization. The algorithm can be described as follows:

Suppose $B_i$ is assigned to each base station. The size of each $B_i$ is initially zero and their size is interactively incremented. The size for each $B_i$ here is not necessary corresponding to the actual occupancy in the RES. The method in determining the exact size of $B_i$ is given later. Consider a terminal, who can communicate with base station i and j, where $B_1$ is allocated to base station i and $B_2$ is allocated to base station j. Define $B_1^*$ and $B_2^*$ to be the estimate occupancy of $B_1$ and $B_2$ in base station i and j. We need to decide whether to associate the mobile to the base station i or base station j. Once the terminal is assigned, the estimated occupancy of that base station will be updated. Consider the following rules: 1) Suppose $B_1^*$ and $B_2^*$ are currently empty, pick the one that has the minimum number of base stations using (e.g. if there are M base stations assigned to $B_1$ and N base stations assigned to $B_2$, where M>N, we will attach the mobile to base station j and $B_2^*=B_2^*+C$, where C is the estimated load/cost of the mobile station). 2) Suppose both base station i and j currently have enough space to accommodate the terminal with cost C, pick the one that has the maximum available space (i.e. max $((B_1-B_1^*), (B_2-B_2^*))$). Once the terminal is assigned, the $B_i^*$ will be updated as described in the case. 3) Suppose both $B_1$ and $B_2$ do not have enough space to accommodate the cost C, pick the one that maximize the overall network utilization (i.e. $\min(M^*(C-(B_1-B_1^*)), N^*(C-(B_2-B_2^*)))$). For this case, once the base station is chosen, the Block size has to be updated for the entire network (e.g. suppose base station i is chosen, we have to increment $B_1$ by $C-(B_1-B_1^*)$ across the network).

We perform this algorithm iteratively on every mobile in the IR(s). The order at which the algorithm acts on the terminals affects the final result. To pick the order at which the algorithm yields the optimal result is NP hard. The method proposed here acts on the terminals according to terminal's connectivity with the base stations, and the terminal with the lowest connectivities is first assigned. By assigning the lowest connectivities first, the algorithm can achieve the optimal with greater chance. On the other hand, if the method assigns the terminals in the reversed order, and the sequence of assignments is not already optimal, it would be more difficult for an algorithm to achieve optimal since the later assignments/terminals have lower number of connectivities, thus imposes more constraint on the algorithm.

3.2.1.5 Allocation Fine Tuning 705

One optional embodiment of the invention proposes to bring down the size of the $B_i$ for i≠0. The algorithm is described as followed:
1) Pick the largest $B_i$, choose the base station with $B_i^*=B_i$.
2) Try to shift its terminal in the IR to its interferer.

3.2.1.6 Resource Sizing 706

In this step, the size of each $B_i$ determined here corresponds to the fraction of the RES allocated to each $B_i$. The determination is based on the cost assignments and the terminal assignments in the previous step (see FIG. 11 for an example of resource partition). The mechanism to compute the size is as follows:
1. compute the total cost for each $B_i$ by summing up the cost of each terminal assigned to $B_i$,
2. compute the total cost of the entire network by summing up the cost of each terminal in the network,
3. compute the scaling factor S(i) by dividing the total cost of the $B_i$ by the total cost of the network,
The size of $B_i$ is defined as S(i)*RES.
Here is a list of policy considered for terminals in the IR(s):
Equal Resource: for this policy, each terminal receives the same amount of resource whether or not it is in the IR (i.e. a terminal gets C slots regardless its location). However, if a terminal is in the IR between two base stations, for the same C slots assigned to the terminal, it would cost the network 2*C. In this policy, we want to achieve fairness, so the terminals in the IR are penalized. To achieve this, the cost of the terminal is divided by the number of base stations it can communicate with.
Equal QoS: for this policy, each terminal receives the same QoS. As opposed to Equal Resource Policy, the terminals in the IR(s) are not penalized. However, the terminals not in the IR(s) are penalized since the terminals in the IR(s) occupy more resource. To achieve this, the cost of each terminal is unchanged.

3.2.2 Micro-Resource Manager

Figure 8:
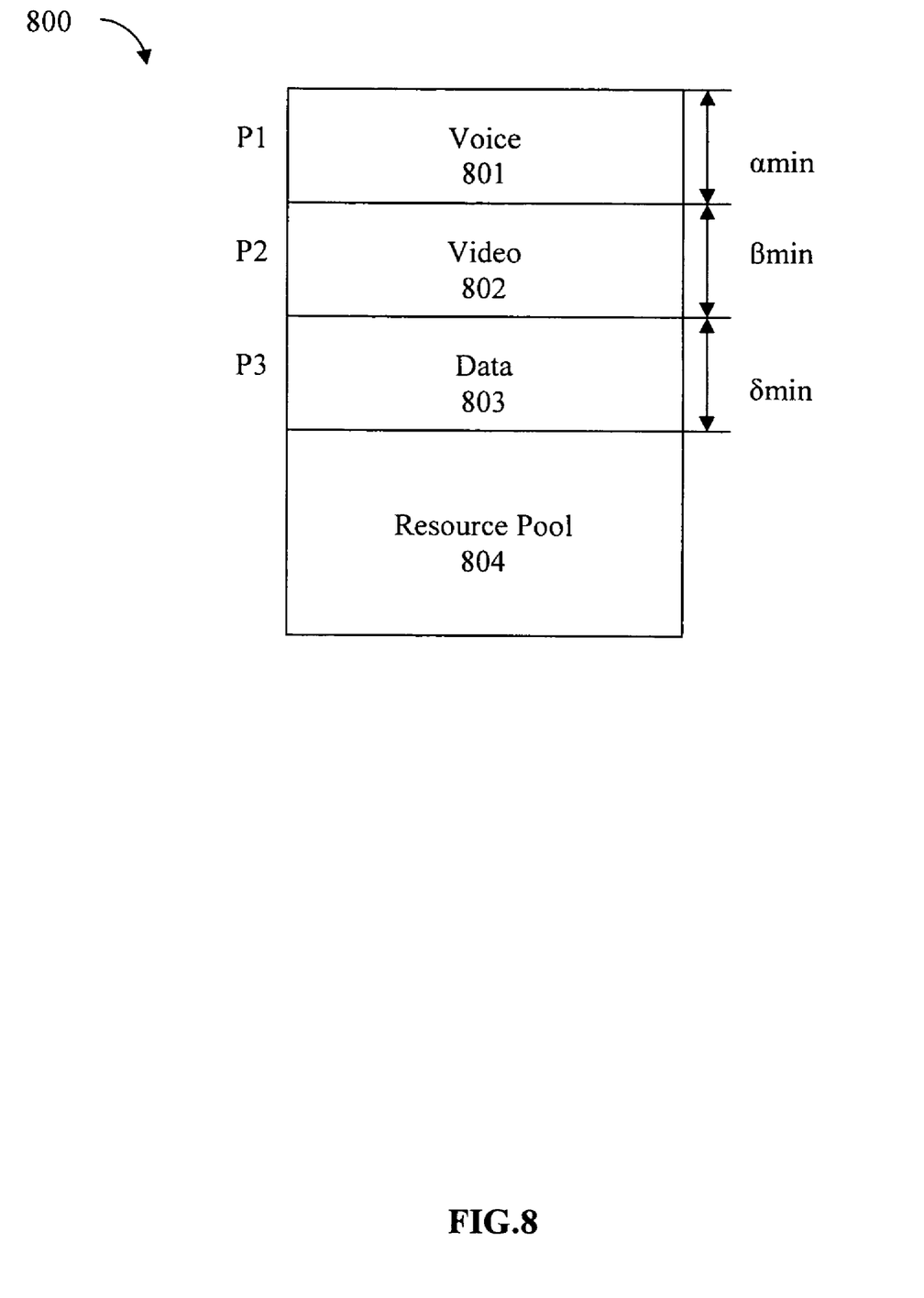
FIG. 8 shows thresholds for voice, video and data, according to an embodiment.
Figure 9:
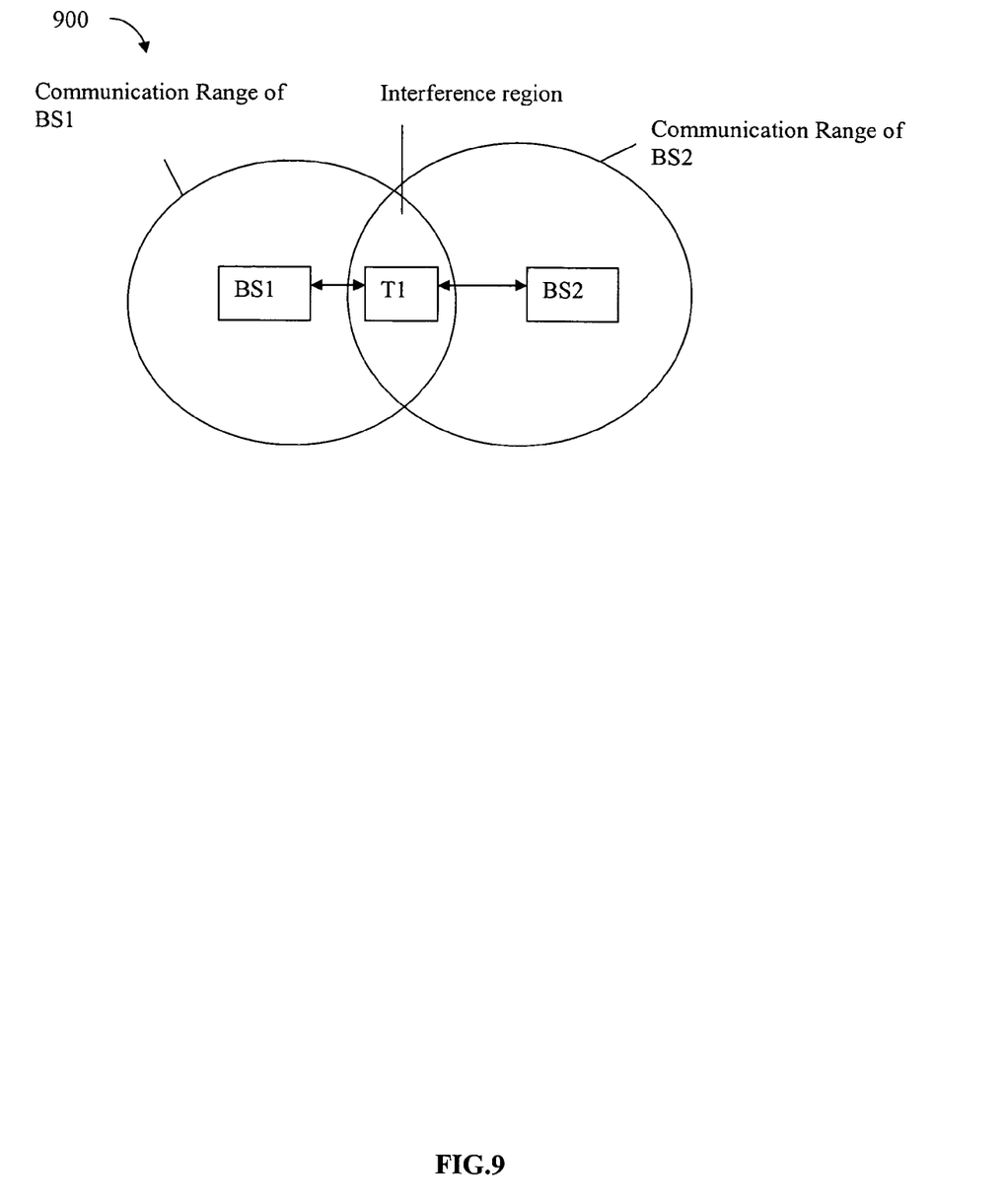
FIG. 9 shows an overlapping area of two base stations, according to an embodiment.
Figure 10:
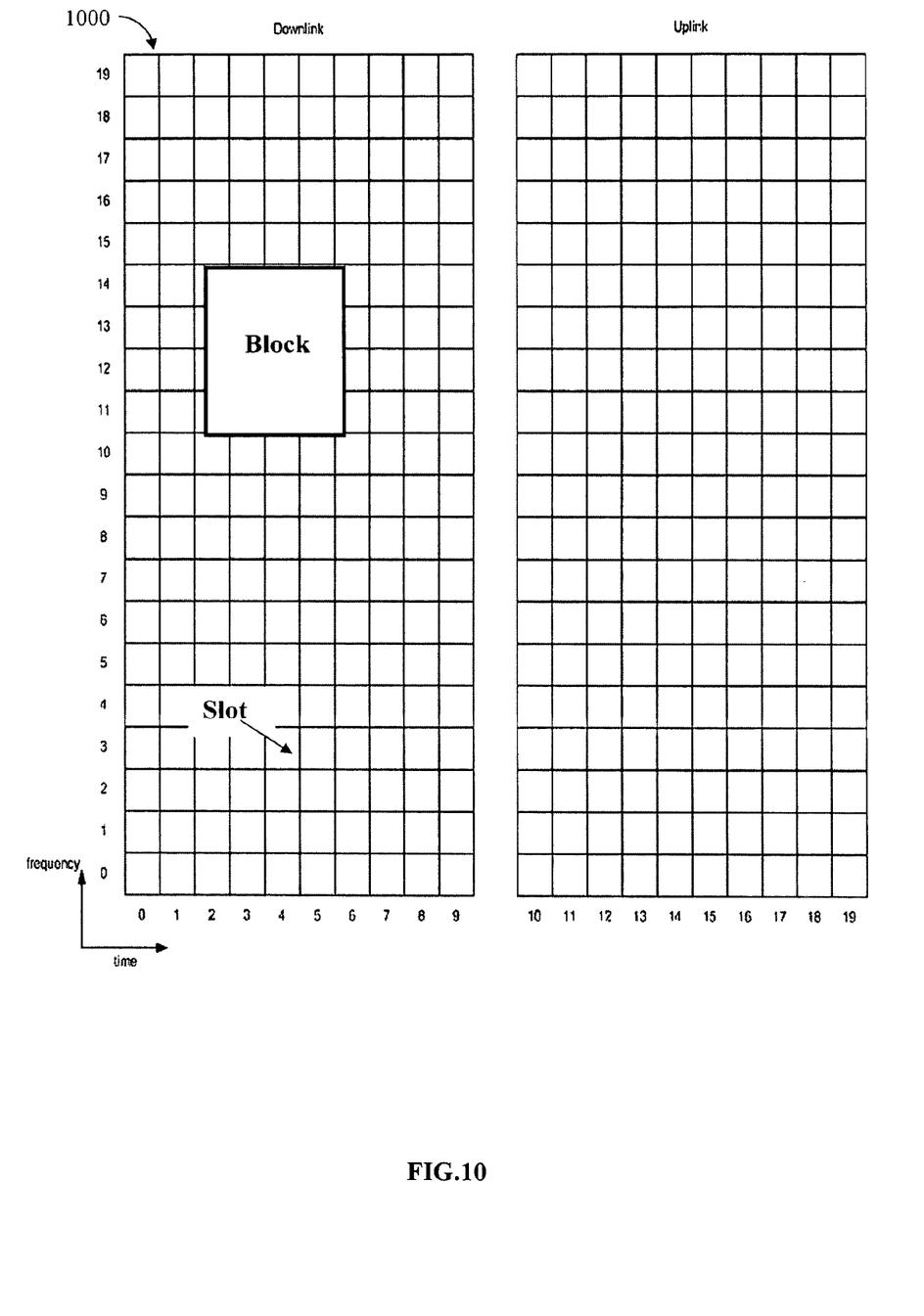
FIG. 10 shows a block definition in an OFDMA frame, according to an embodiment.

The Micro-Resource Manager runs in each Base Station. FIG. 8 contains the initial bandwidth allocation for each service classes. It's the responsibility of the micro-resource manager to guarantee QoS within the allocated blocks. Each service type is pre-allocated with fixed minimum bandwidth called αmin, βmin and δmin for voice, video and data respectively. Resource Pool contains the remaining available resource. Once any of the initial allocation is filled, it is allowed to occupy resources in the Resource Pool. However, the higher priority request takes precedence over the lower priority request. The subsequent request from a node for each service type will be de-prioritized, and the priority is assigned based on its service class, number of open connection of a given type, remaining resource in the Resource Poll.

Once the resource is granted to a connection, the resource manager will enhance the quality of the connection through channel diversity. Packet transmissions per connection are reshuffled both in frequency and in time to combat narrowband noise and fading.

3.2.3 System Update

The Feedback Control is used by the central controller to resize the $B_i$ during run-time. Since the network topology and the traffic demand keep changing over time, some $B_i$ can be over-utilized or under-utilized at any given time. The method proposed here allows the central controllers to resize $B_i$ to meet traffic demand. The mechanism is described as follows: Each base station periodically reports to the central controller the average utilization of the Block used by the terminals attached to it who are in its IR as well as for the block used by terminals attached to it who are not in the IR.

The following are the rules for system update:
Rule 1: Terminal assignment: When a terminal located in IR request to access the network, the central controller can decide which base station it should connect to considering the network performance. Central Controller can decide according to utilization of particular regions as well as other constraints. For the terminals that are not in the IR(s) request to access the network, the decision is left to the base station.
Rule 2: Periodic resource sizing: Central Controller periodically executes the resource sizing defined in FIG. 7 based on the traffic history of each mobile.
Rule 3: Event based resource management: Central Controller aperiodically executes the full resource management defined in FIG. 7 when the utilization reaches a limit, or when the utilizations are highly unbalanced.

These rules can be generalized and service provider can configure these rules appropriately according to the topology and utilization. An example definition of the utilization could be ratio of allocated over total resources as well as number of dropped sessions.

The invention claimed is:

1. A method for allocating network wide adaptive resources, comprising:
   providing a plurality of base stations each including a micro scheduler having traffic allocation logic to allocate an orthogonal frequency-division multiple-access (OFDMA) frame;
   providing a plurality of subscribers in communication with the plurality of base stations;
   providing a central controller in communication with the plurality of base stations, the central controller including a macro level scheduler configured to police traffic forwarded to each base station, the micro scheduler and the macro level scheduler controlling and optimizing radio frequency and backhaul the network wide adaptive resources in unison;
   identifying subscribers in a first overlapping region of two or more base stations by the central controller;
   assigning a second region in the OFDMA frame to a particular base station; and
   blocking out the second region for other base stations in conflict with the particular base station.

2. A network comprising:
   a central controller;
   a plurality of base stations to communicate with the central controller; and
   a plurality of subscribers to communicate with at least one base station using an orthogonal frequency-division multiple-access (OFDMA) protocol;
   the at least one base station including a micro scheduler having a traffic allocation logic to allocate an OFDMA frame, the central controller including a macro level scheduler configured to police traffic that is forwarded to each of the base stations, the micro scheduler and macro level scheduler configured to control and optimize radio frequency and backhaul network wide adaptive resources by being configured to:
   identify subscribers in a first overlapping region of two or more base stations;
   assign a second region in the OFDMA frame to a particular base station; and
   block out the second region for other base stations in conflict with the particular base station.

3. The method of claim 1, further comprising assigning the network wide adaptive resources to the plurality of base stations by partitioning the network wide adaptive resources into blocks and assigning the blocks to the plurality of base stations.

4. The method of claim 3, wherein the network wide adaptive resources are partitioned into the blocks of equal sizes.

5. The method of claim 3, wherein partitioning the network wide adaptive resources into the blocks comprises:
   determining a total cost for a block by summing up a cost of each subscriber assigned to the block;
   determining a total cost of the network by summing up the cost of each subscriber in the network;
   determining a scaling factor by dividing the total cost of the block by the total cost of the network; and
   determining a size of the block by multiplying the network wide adaptive resources of the network by the scaling factor of the block.

6. The method of claim 5, further comprising receiving from the micro scheduler an average utilization of the block used by the subscribers attached to the particular base station and resizing the block to meet a traffic demand.

7. The method of claim 5, further comprising receiving from the micro scheduler an average utilization of a block used by the subscribers attached to the particular base station and allocating one or more subscribers to a different base station to meet the traffic demand.

8. The network of claim 2, wherein the micro scheduler allocates a minimum bandwidth for voice, video and data transmissions in the OFDMA frame and allocates remaining bandwidth to an OFDA frame pool.

9. The network of claim 8, wherein the micro scheduler allocates bandwidth from the OFDMA frame pool when the minimum bandwidth is filled.

10. A method for managing adaptive resources in a communication network comprising:
    identifying one or more subscribers in an interference region of a base station, the interference region being an area which is in a communication range of more than one base station;
    partitioning the adaptive resources into a plurality of blocks;
    assigning a first block to the base station for the one or more subscribers which are in the interference region;
    assigning a second block to the base station for the subscribers which are not in the interference region;
    assigning the one or more subscribers in the interference region to the base station; and
    blocking the first block for the other base stations in the interference region.

11. The method of claim 10, wherein identifying the one or more subscribers in the interference region of the base station, comprises:
    creating a connectivity map for all base stations and all subscribers in the communication network; and
    identifying the one or more subscribers, in the connectivity map, which are in a communication range of more than one base station.

12. The method of claim 10, further comprising determining a cost weight of each of the one or more subscribers.

13. The method of claim 12, wherein the cost weight of each of the one or more subscribers is function of receive/transmit signal strength and traffic demand.

14. The method of claim 12, wherein the cost weight of each of the one or more subscribers is average traffic demand for each subscriber divided by the highest available rate of the subscriber.

15. The method of claim 10, wherein assigning the one or more subscribers in the interference region to the base station comprises:
    estimating an occupancy of blocks assigned to the base stations which are in communication range of the one or more subscribers; and
    assigning the one or more subscribers to a particular base station based on the estimated occupancy of the blocks.

16. The method of claim 15, wherein assigning the one or more subscribers to the particular base station based on the estimated occupancy comprises:
    if the estimated occupancy of the blocks assigned to the base stations are empty then assigning the one or more subscribers to the particular base station assigned to a block having minimum number of the base stations.

17. The method of claim 15, wherein assigning the one or more subscriber to the particular base station based on the estimated occupancy comprises:
    if the estimated occupancy of the blocks have enough space to accommodate the subscriber, assigning the subscriber to the particular base station attached to the block with a maximum available space.

18. The method of claim 15, wherein assigning the one or more subscribers to the particular base stations based on the estimated occupancy comprises:

if the estimated occupancy of the blocks does not have enough space to accommodate the one or more subscribers, assigning the one or more subscribers to the particular base station based on overall network utilization; and resizing the blocks of the communication network.

19. The method of claim 18, wherein the overall network utilization is calculated as minimum of $(M*(C-(Bi-Bi*)))$ wherein, M is a number of base stations attached to block i, C is a cost weight of the subscriber, Bi is an actual occupancy of the block Bi, and Bi* is an estimated occupancy of the block Bi.

20. The method of claim 10, further comprising:

receiving periodic reports by a central controller for an utilization of the blocks used by the terminals attached to the base station; and resizing the blocks based on the utilization of the blocks, when the utilization reaches a predefined limit or the utilization is unbalanced.

* * * * *